(No Model.)

S. F. GOLD.
VALVE.

No. 501,713.

Patented July 18, 1893.

WITNESSES:
John A. Rennie
Fred White

INVENTOR:
Samuel F. Gold,
By his Attorneys,
Arthur C. Fraser & Co.

UNITED STATES PATENT OFFICE.

SAMUEL F. GOLD, OF ENGLEWOOD, NEW JERSEY.

VALVE.

SPECIFICATION forming part of Letters Patent No. 501,713, dated July 18, 1893.

Application filed March 11, 1893. Serial No. 465,513. (No model.)

*To all whom it may concern:*

Be it known that I, SAMUEL F. GOLD, a citizen of the United States, residing at Englewood, in the county of Bergen and State of New Jersey, have invented certain new and useful Improvements in Faucet-Valves, of which the following is a specification.

This invention relates to valves generally, but is more particularly intended for application to faucet valves.

The invention aims to provide an improved valve of simple and convenient construction and operation and which can be readily renewed or repaired in case of impairment of the seat.

To this end in carrying out my invention in its preferred form as applied to faucets, I construct the faucet head with an ingress passage leading into the valve, a seating face surrounding this passage and a screw thread, and I provide a plunger having a plurality of screw threads each utilizable for engaging the screw thread of the head, having a plurality of apertures, one for each of said screw threads and serving as spouts for the plunger, having a tubular interior, and a plurality of valve seats, one for each of said screw threads and each utilizable for engaging said seating face to close the faucet when its corresponding screw thread engages that of the head, the plunger and seats being constructed in such manner that when one seat becomes impaired the screw thread corresponding thereto can be disengaged from the head, and the plunger moved to bring another screw thread into engagement with the head, and thereby bring its seat into engagement with said seating face, in place of the seat previously used.

Figure 1:
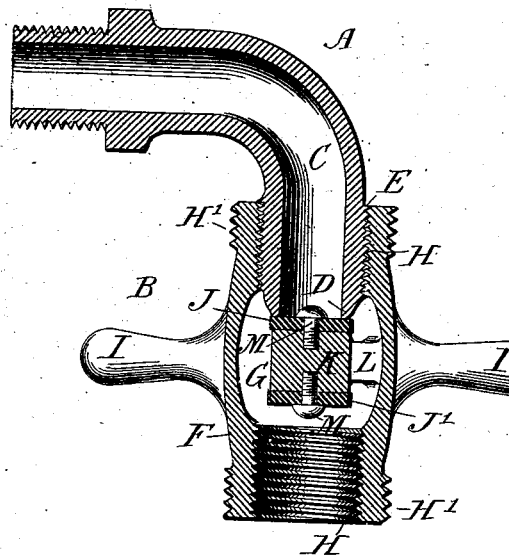
Figure 2:
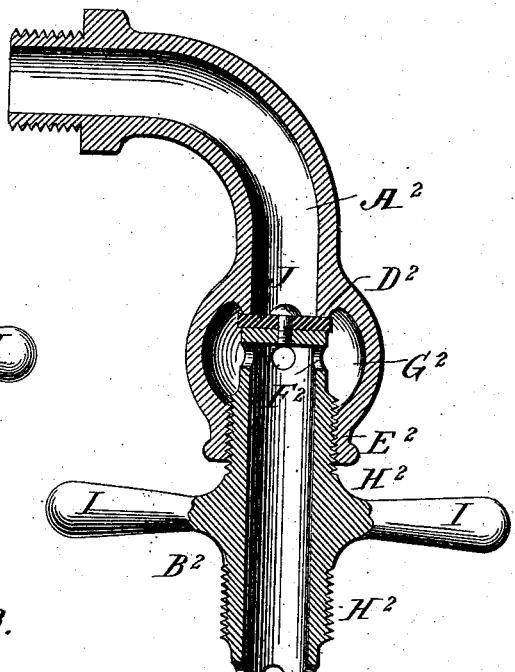
Figure 3:
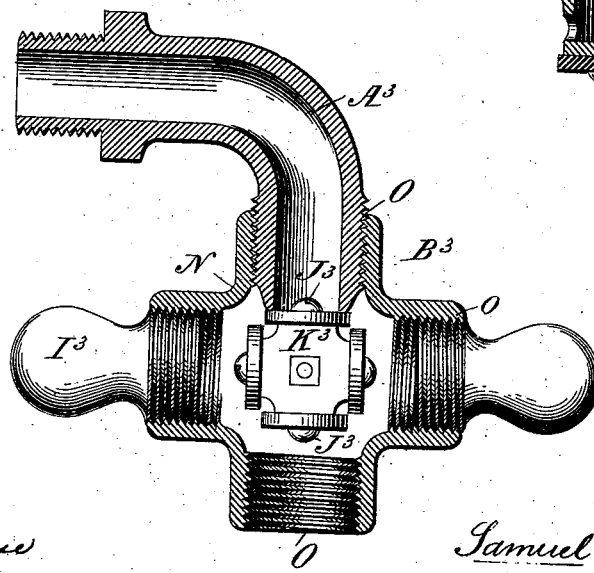

In the accompanying drawings, which illustrate certain adaptations of my invention as applied to a faucet, Figure 1 is an axial section of a faucet constructed according to the preferred form of my invention, the parts being in the closed position. Fig. 2 is a similar view of a modification, and Fig. 3 is a similar view of another modification.

Referring to Fig. 1 I will first describe the preferred form of my invention.

In the faucet here shown let A indicate the head and B the plunger as a whole. The head A may be any suitable pipe, bend, spout or casing. It is constructed with an ingress passage C terminating at and surrounded by a seat-face D of annular construction and preferably disposed horizontally, and relatively to this seating face as convenience dictates is disposed a screw thread E on the head, that shown in this instance being an external screw thread above the seating face D.

The plunger B may be of any suitable construction. That shown consists of a tubular sleeve or socket F having bulging hollow interior G at its middle and terminating at top and bottom in internal screw threads H H fitting the screw thread E of the head, through each of which is an aperture leading from the interior to the exterior of the plunger. Handles I are preferably provided on the outer portion of the plunger. The plunger carries a plurality of valve seats, two being shown in Fig. 1 and lettered, that at top J, and that at bottom J′, one for each of said apertures and corresponding with each screw-thread H, each of which seats co-operates with the seating face D of the head, when its corresponding screw-thread H is in engagement with the screw-thread E thereof. Preferably the socket F is constructed internally with a plug K disposed centrally of the bulge G and formed integrally with the socket, being connected to the inner walls thereof by one or more webs L, around which a passage exists from the top to bottom of the socket. Any other suitable provision for supporting the plug K can be utilized if desired.

The top faces of the plug K are dressed off flat, and provided with screw threaded holes into which are screwed screws M, the heads of which serve to clamp the seats J and J′ in position. The seats J and J′ may be constructed in any manner and of any material. Preferably they are composition packing washers around which there exists an annular space within the socket. The top faces of the seats J and J′ are preferably disposed some distance within the inner ends of the adjacent screw threads H, and the seats and screw threads are arranged on the same axis.

In operation the head A will constitute the discharge end of a water pipe or any other duct which is to be controlled by the faucet, and will occupy a fixed position. The plunger B will be screwed with one of its screw threads H onto the screw thread E of the head until one of its seats J or J' engages intimately with the seating face D of the head, thus closing the faucet. To open it the plunger will be screwed in the opposite direction to the desired extent. The closing of the faucet limits the movement of the plunger in that direction, while there is no limit to its opening movement, the screw threads E and H being free to rotate until the socket F becomes detached from the head. When the valve is opened the outflow passes from the passage C between the seating face D and seat J, around the edges of the latter, through the bulge G past the lower seat J' and out of the aperture at bottom in which the lower screw thread H is formed. When the valve is closed the joint is at the point of engagement between the seat and seating face, and hence the matter restrained from escaping is confined entirely within the head A and the remainder of the faucet is empty and free of access. Therefore there is no necessity for any packing joint between the two parts.

The plunger may be rotated by the handles I I, or it may have any other suitable provision or may be grasped bodily. The discharge passage being through the plunger and of sufficient area to permit the passage of water through the valve there is no danger of any leakage on outside of the socket F. The exterior of the socket can be made very ornamental and as it incloses the open end of the head A it gives an attractive appearance to the faucet as a whole.

It is essential that the screw thread H and seat be duplicated at each end of the socket, as it possesses the advantage that either end of the plunger may be used. Thus should one seat J become impaired or worn out it is only necessary to entirely unscrew the plunger from the head, reverse it and again connect it in order to temporarily repair the valve. In this manner, both seats being perfect at first, the faucet can be used with one seat until this becomes worn out and the plunger can then be reversed by any unskilled person and used with the other seat until this is worn out, thereby approximately doubling the life of the faucet. When reversed the aperture through the screw-thread H previously engaging the head A, serves as the outlet or spout of the plunger.

The renewal of the seats is a very simple operation and one can be renewed while the other is in use by simply unscrewing the screw M and attaching a new head to the outer end of the socket F. This operation requires no special skill. The lower screw thread H is convenient for connection with a hose coupling when desired. The outer ends of the socket may also be externally screw threaded at H' H', whereby the hose or any other desired connection may be made on these screw threads instead of the internal ones.

It will be seen that my invention provides an improved faucet which is extremely simple in construction, consisting essentially of only two loosely connected parts, one of which can be applied in several positions to the other, which can be assembled by any ordinary person.

It will be understood that the invention can be variously availed of without departing from its essential features, and that it is not limited to the particular details of construction and operation hereinbefore described as its preferred form.

Fig. 2 shows a modification in which the head here lettered $A^2$ has a bulge here lettered $G^2$ below its seating face here lettered $D^2$ and an interal screw thread here lettered $E^2$ below the bulge, while the plunger lettered $B^2$ consists of a tubular stem having external screw threads $H^2$ at its opposite ends engaging the threads $E^2$ of the head, and carrying at its respective ends seats $J^2$ $J^2$, one within the bulge $G^2$ and engaging the seating face $D^2$. The opposite ends of the plunger are alike. With this construction the discharge escapes around the seat $J^2$ into the bulge $G^2$ and then through apertures $F^2$ and out through the hollow interior of the stem.

Another modification is shown in Fig. 3, in which the head lettered $A^3$ is identical in construction with that shown in Fig. 1, while the plunger lettered $B^3$ consists of a hollow casing N having four screw threaded apertures O and carrying a central plug $K^5$ swiveled within the casing and having four seats $J^3$, one corresponding to each screwthreaded aperture O any one of which can be used with any one of the apertures O to engage the seating face of the head as desired. The handles lettered $I^3$ have screw threaded ends which are screwed into the opposite apertures O, while the other two opposite apertures are used, the one for engagement with the screw thread of the head, and the other for the discharge nozzle of the faucet. With this construction the four seats $J^3$ can be respectively used either by rotating the plug $J^3$ relatively to the casing N, or by reversing the casing relatively to the head until each of its apertures O has been in connection therewith. The features of a plurality of successively utilizable seats in connection with, and corresponding to, a plurality of successively utilizable screw-threads H, may be variously availed of in valves generally with much advantage.

What I claim is, in valves, the following-defined novel features and combinations, substantially as hereinbefore set forth, namely:

1. In a valve, a head, having a discharge passage, a screwthread adjacent thereto, and a seating face, in combination with a plunger, having screwthreads at both its ends, each of said screwthreads fitting that of said head, and having two valve seats, one for each of said screwthreads and each engaging said seat face when its corresponding screwthread is in engagement with the screwthread of said head, whereby the plunger can be reversed, and thereby a different seat brought against said face, at will, substantially as and for the purpose set forth.

2. In a valve, a head, having a passage, a screw-thread adjacent thereto, and a seating face, in combination with a hollow plunger having a plurality of screw-threads each fitting and successively engaging the screw-thread of said head, and having a plurality of seats corresponding with its screw-threads and successively engaging said seating face, whereby by shifting the plunger and bringing a different screw-thread into engagement with that of the head one of said seats may be substituted for another when desired, substantially as and for the purpose set forth.

3. In a faucet, the head A having passage C, seating face D, and screw thread E, in combination with the plunger B, consisting of the socket F, having screw thread H at both its ends, axial plug K intermediate of said screw thread, seats J and J' corresponding each to one of said screw threads H, said threads H each fitting and successively engaging said thread E, said seats J and J' respectively engaging said face D as their corresponding thread H is in engagement with said thread E, and said socket constructed with an internal passage and an aperture through each of said screw threads H through which the discharge from the valve may escape, substantially as and for the purpose set forth.

In witness whereof I have hereunto signed my name in the presence of two subscribing witnesses.

SAMUEL F. GOLD.

Witnesses:
GEORGE H. FRASER,
CHARLES K. FRASER.